(12) United States Patent
Damudi et al.

(10) Patent No.: US 10,097,836 B2
(45) Date of Patent: Oct. 9, 2018

(54) METHOD AND DEVICE TO MARK A REFERENCE PICTURE FOR VIDEO CODING

(71) Applicant: SAMSUNG ELECTRONICS CO., LTD., Suwon-si (KR)

(72) Inventors: Mohammed Quaid Damudi, C.V.Raman Nagar Bangalore (IN); Austin Lobo, Bangalore (IN)

(73) Assignee: SAMSUNG ELECTRONICS CO., LTD., Gyeonggi-do, Suwon-si (KR)

( * ) Notice: Subject to any disclaimer, the term of this patent is extended or adjusted under 35 U.S.C. 154(b) by 134 days.

(21) Appl. No.: 15/252,476

(22) Filed: Aug. 31, 2016

(65) Prior Publication Data

US 2017/0094299 A1 Mar. 30, 2017

(30) Foreign Application Priority Data

Sep. 28, 2015 (IN) .......................... 5182/CHE/2015

(51) Int. Cl.
*H04N 19/174* (2014.01)
*H04N 19/15* (2014.01)
*H04N 19/105* (2014.01)
*H04N 19/70* (2014.01)

(52) U.S. Cl.
CPC ......... *H04N 19/174* (2014.11); *H04N 19/105* (2014.11); *H04N 19/15* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 9,648,321 B2* | 5/2017 | Wang | ..................... | H04N 19/50 |
| 9,762,909 B2* | 9/2017 | Lee | ..................... | H04N 19/105 |
| 9,883,181 B2* | 1/2018 | Deshpande | ............ | H04N 19/70 |
| 2013/0142257 A1* | 6/2013 | Wang | ..................... | H04N 19/50 |
| | | | | 375/240.12 |
| 2013/0188709 A1* | 7/2013 | Deshpande | ............ | H04N 19/70 |
| | | | | 375/240.13 |
| 2013/0215975 A1* | 8/2013 | Samuelsson | ........... | H04N 19/70 |
| | | | | 375/240.25 |
| 2013/0272398 A1* | 10/2013 | Deshpande | ...... | H04N 19/00533 |
| | | | | 375/240.12 |
| 2014/0079119 A1* | 3/2014 | Samuelsson | ........... | H04N 19/50 |
| | | | | 375/240.12 |
| 2014/0126640 A1* | 5/2014 | Samuelsson | ........... | H04N 19/70 |
| | | | | 375/240.16 |
| 2014/0169449 A1* | 6/2014 | Samuelsson | ..... | H04N 19/00024 |
| | | | | 375/240.02 |
| 2014/0198857 A1* | 7/2014 | Deshpande | .......... | H04N 19/513 |
| | | | | 375/240.25 |
| 2014/0334556 A1* | 11/2014 | Shibahara | .............. | H04N 19/44 |
| | | | | 375/240.27 |
| 2015/0264404 A1* | 9/2015 | Hannuksela | ........... | H04N 19/70 |
| | | | | 375/240.16 |
| 2015/0271487 A1* | 9/2015 | Li | ........................ | H04N 19/105 |
| | | | | 375/240.02 |
| 2016/0182916 A1* | 6/2016 | Lee | ..................... | H04N 19/105 |
| | | | | 375/240.12 |

(Continued)

*Primary Examiner* — Reza Aghevli (74) *Attorney, Agent, or Firm* — Sughrue Mion, PLLC (57) ABSTRACT

A video coding method providing for early release of pictures in a decoded picture buffer (DPB) after decoding the current picture.

8 Claims, 6 Drawing Sheets

(56) References Cited

U.S. PATENT DOCUMENTS

2017/0142418 A1* 5/2017 Li .......................... H04N 19/70
2017/0339427 A1* 11/2017 Lee ...................... H04N 19/105
2018/0063550 A1* 3/2018 Tech .................... H04N 19/176

* cited by examiner

METHOD AND DEVICE TO MARK A REFERENCE PICTURE FOR VIDEO CODING

CROSS-REFERENCE TO RELATED APPLICATION

This application claims priority from Indian Patent Application No. 5182/CHE/2015 filed on Sep. 28, 2015, in the Indian Patent Office, the disclosure of which is incorporated herein by reference in its entirety.

BACKGROUND

1. Field

Methods and apparatuses consistent with exemplary embodiments relate to video coding systems, and more particularly to a mechanism to mark a reference picture for video coding.

2. Description of Related Art

High Efficiency Video Coding (HEVC) (i.e., H.265) is a video coding standard developed for coding a video signal. In HEVC, reference pictures are marked only at the beginning of decoding of a first slice of a current picture. The marked reference picture remains until the completion of decoding of the current picture. There is no marking process after decoding of the current picture. After completion of decoding of the last slice, no marking is applied to the decoded picture list. As a result, there is a one frame delay in releasing of decoded picture buffers (DPBs), which are no longer necessary to be stored for reference by subsequent pictures to be subsequently decoded. Because the memory requirement of the DPB is large for high resolution videos, maintaining the DPBs results in suboptimal usage of memory resources.

SUMMARY

Aspects of the exemplary embodiments provide a mechanism to mark a reference picture for video coding.

Aspects of the exemplary embodiments provide a mechanism for early releasing reference pictures unused for reference in a Decoded Picture Buffer (DPB).

Aspects of the exemplary embodiments provide a mechanism for embedding a pre-marking command and a post-marking command in a Reference Picture Set (RPS). The pre-marking may be applied before decoding a current slice of the current picture and the post-marking may be applied after decoding a last slice of the current picture.

Aspects of the exemplary embodiments provide a mechanism for decoding the current slice of the current picture to extract the RPS.

Aspects of the exemplary embodiments provide a mechanism for marking the reference picture in the DPB with a post-marking command based on a Network Abstraction Layer (NAL) unit type.

Aspects of the exemplary embodiments provide a mechanism for releasing a co-located motion vector buffer associated with a reference picture marked as unused for reference in the DPB.

According to an aspect of an exemplary embodiment, there is provided a method for marking a reference picture for video coding including embedding, by a coding unit, a pre-marking command and a post-marking command in a Reference Picture Set (RPS) for a current picture. The pre-marking is applied before decoding a current slice of the current picture and the post-marking is applied after decoding a last slice of the current picture.

According to an aspect of an exemplary embodiment, there is provided a method for marking a reference picture for video coding including decoding, by a coding unit, a current slice of a current picture to extract a Reference Picture Set (RPS) from the current slice. The method includes determining, by the coding unit, whether the current slice is a last slice of the current picture. Further, the method includes marking, by the coding unit, a reference picture in a Decoded Picture Buffer (DPB) with the post-marking command based on Network Abstraction Layer (NAL) unit type. Furthermore, the method includes performing an action on the DPB based on the NAL unit type.

According to an aspect of an exemplary embodiment, there is provided a video coding device for marking a reference picture for video coding including a coding unit configured to embed a pre-marking command and a post-marking command in a Reference Picture Set (RPS) of a current picture. The pre-marking is applied before decoding a current slice of the current picture and the post-marking is applied after decoding a last slice of the current picture.

According to an aspect of an exemplary embodiment, there is provided a video coding device for marking a reference picture for video coding including a coding unit configured to decode a current slice of a current picture to extract a Reference Picture Set (RPS) from the current slice. The coding unit is configured to determine whether the current slice is a last slice of the current picture. Further, the coding unit is configured to mark a reference picture in a Decoded Picture Buffer (DPB) with a post-marking command based on a Network Abstraction Layer (NAL) unit type. Furthermore, the coding unit is configured to perform an action on the DPB based on the NAL unit type.

According to an aspect of an exemplary embodiment, there is provided a computer program product comprising computer executable program code recorded on a computer readable non-transitory storage medium. The computer executable program code when executed causing the actions including embedding a pre-marking command and a post-marking command in a Reference Picture Set (RPS) for a current picture. The pre-marking is applied before decoding a current slice of the current picture and the post-marking is applied after decoding a last slice of the current picture.

According to an aspect of an exemplary embodiment, there is provided a computer program product comprising computer executable program code recorded on a computer readable non-transitory storage medium. The computer executable program code when executed causing the actions including decoding a current slice of a current picture to extract a Reference Picture Set (RPS) from the current slice. The computer executable program code when executed causing the further actions including determining whether the current slice is a last slice of the current picture. The computer executable program code when executed causing the further actions including marking a reference picture in a Decoded Picture Buffer (DPB) with a post-marking command based on Network Abstraction Layer (NAL) unit type. The computer executable program code when executed causing the further actions including performing an action on the DPB based on the NAL unit type.

The above and other aspects of the exemplary embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the exemplary embodiments herein without departing from the spirit thereof, and the exemplary embodiments herein include all such modifications.

BRIEF DESCRIPTION OF THE DRAWINGS

Aspects of the present disclosure are illustrated in the accompanying drawings, throughout which like reference letters indicate corresponding parts in the various figures. The exemplary embodiments herein will be better understood from the following description with reference to the drawings, in which.

DETAILED DESCRIPTION OF THE EXEMPLARY EMBODIMENTS

The disclosure and the various features and advantageous details thereof are explained more fully with reference to the non-limiting exemplary embodiments and the accompanying drawings. Descriptions of well-known components and processing techniques are omitted to avoid unnecessarily obscuring the exemplary embodiments herein. Also, the various exemplary embodiments described herein are not necessarily mutually exclusive, as some exemplary embodiments may be combined with one or more other exemplary embodiments to form new embodiments.

The term "or" as used herein, refers to a non-exclusive or, unless otherwise indicated.

As used herein, the term "and/or" includes any and all combinations of one or more of the associated listed items.

Expressions such as "at least one of," when preceding a list of elements, modify the entire list of elements and do not modify the individual elements of the list.

It will be understood that the terms "comprise" and/or "comprising" when used in this specification, specify the presence of stated features, integers, steps, operations, elements, and/or components, but do not preclude the presence or addition of one or more other features, integers, steps, operations, elements, components, and/or groups thereof.

Also, the terms "unit", "module", etc. mean units for processing at least one function or operation and may be embodied as hardware, software, or a combination thereof.

The examples used herein are intended merely to facilitate an understanding of ways in which the exemplary embodiments herein may be practiced and to further enable those skilled in the art to practice the exemplary embodiments. Accordingly, the examples should not be construed as limiting the scope of the exemplary embodiments herein.

Prior to describing the exemplary embodiments in detail, definitions for key terms used herein are provided. Unless defined otherwise, all technical terms used herein have the meaning as commonly understood by a person having ordinary skill in the art of video coding to which this disclosure belongs.

Network Abstraction Layer (NAL) unit: non-exclusively refers to a syntax structure indicating a type of data to follow. In an exemplary embodiment, bytes representing such data may be expressed in the form of a Raw Byte Sequence Payload (RBSP) interspersed as necessary with emulation prevention bytes.

Reference Picture Set (RPS): non-exclusively refers to a set of reference pictures associated with a picture. The RPS consists of all reference pictures that are decoded prior to the associated picture in a decoding order, which may be used for inter prediction of the associated picture or any picture following the associated picture in the decoding order.

Decoded Picture Buffer (DPB): non-exclusively refers to a buffer that maintains decoded pictures for reference, output reordering, or output delay.

Picture Order Count (POC): non-exclusively refers to a variable that is associated with each picture to be output from the DPB. The POC indicates a position of the associated picture in an output order relative to the output order positions of the other pictures to be output from the DPB in same coded video sequence.

Memory Management Control Operation (MMCO): non-exclusively refers to (seven) operations defined in H.264 decoding standard that control reference picture marking.

Reference Picture Marking: non-exclusively refers to a process of marking decoded pictures for inter prediction.

Picture: non-exclusively refers to a frame or a field of a frame. It should be understood that the "picture" refers to a complete picture (image) captured during a time interval.

In HEVC, a list of pictures needed by a current picture and a future picture is signaled in RPS. A reference picture marking process is performed (directly) after parsing of a first slice of every picture, instead of marking after decoding the picture. This method improves error resilience, simplifies temporal scalability and enables decoding at a minimum number of decoded picture buffer slots.

The HEVC standard introduced a mechanism for reference picture management, referred as RPS or buffer description. The most fundamental difference with the RPS compared to MMCO/sliding window of H.264/AVC is that, for each particular slice, a complete set of the reference pictures that are used by the current picture or any subsequent picture must be provided.

Thus, a complete set of all pictures that must be kept in the DPB for use by the current or future picture is signaled. This is different from the H.264/AVC scheme in which only relative changes to the DPB are signaled. With the RPS concept, no information from earlier pictures in decoding order is needed to maintain the correct status of reference pictures in the DPB Every picture in the DPB is uniquely identified by its POC value. In RPS, reference pictures are identified by delta_POC relative to POC of current picture being decoded. A first picture in a decoding order is an Instantaneous Decoding Refresh (IDR) picture for which no RPS is signaled, because no picture that precedes the IDR picture in decoding order can be used for reference by the IDR picture or by any picture that follows the IDR picture in decoding order.

A flag "used_by_current_pic_flag" indicates that entries in reference picture entries in RPS needed by current picture or future pictures. If a picture is available in the DPB and is not included in current RPS, then that picture is marked as unused for reference.

Various steps involved in picture decoding and management of DPB in the HEVC standard are described herein. After parsing a first slice of every picture, RPS is applied to the DPB. If any picture in the DPB is not present in RPS then, that picture in the DPB is marked as "unused_for_ref." After decoding current picture, the current picture is marked as "used_for_reference" and is stored in the DPB. The bumping process (sending pictures to output) can be performed either before decoding or after decoding current picture. If the number of non-displayed pictures in DPB is larger than num_reorder_frames then, one of the non-displayed pictures from DPB with a least POC value is sent to output. If a picture is marked as "unused_for_ref" and is already displayed, the picture is removed from the DPB.

Aspects of the exemplary embodiments herein achieve a method for marking a reference picture for video coding including embedding a pre-marking command and a post-marking command in a Reference Picture Set (RPS) for a current picture.

The pre-marking may be applied before decoding a current slice of the current picture and the post-marking may be applied after decoding a last slice of the current picture.

Aspects of the exemplary embodiments may include decoding a current slice of the current picture to extract the RPS from the current slice, determining whether the current slice is a last slice of the picture, marking a reference picture in a Decoded Picture Buffer (DPB) with the post-marking command based on a Network Abstraction Layer (NAL) unit type, and performing an action on the DPB based on the NAL unit type.

Aspects of the exemplary embodiments may include releasing a reference picture marked as unused for reference in the DPB, maintaining a reference picture marked as used for reference in the DPB and releasing a co-located motion vector buffer associated with a reference picture marked as unused for reference in the DPB.

Aspects of the exemplary embodiments may include decoding a current slice of a current picture to extract a RPS from the current slice, determining whether the current slice is a last slice of the current picture, marking a reference picture in a DPB with the post-marking command based on NAL unit type, and performing an action on the DPB based on the NAL unit type.

Unlike the conventional systems and methods, the present disclosure provides for early release of the reference pictures marked as unused for reference from the DPB. For example, post-marking commands are included in the RPS along with pre-marking commands. The pre-marking commands may be applied before decoding the current slice of the current picture and the post-marking commands may be applied after decoding the last slice of the current picture. With the post-marking commands, the reference picture can be marked as used for reference or unused for reference. The reference picture marked as unused for reference may be released from the DPB (instantly) after decoding the last slice of the current picture. Thus, early release of the reference pictures may be obtained, as opposed to the conventional system, in which the reference picture marked as unused for reference is released at the beginning of decoding of subsequent picture in the video.

Unlike the conventional HEVC standard, nal_ref_idc flag is introduced for post-marking of the current picture. In an exemplary embodiment, nal_unit type is defined from reserved nal_unit_type category (such as nal_unit_type=10, 12, 14, 22, 23, 24~31). When the nal_unit type is any of these values (10, 12, 14, 22, 23, 24~31), it can be inferred that nal_ref_idc is equal to zero and the current picture can be considered as the reference picture marked as unused for reference. For other nal_unit_type, nal_ref_idc is equal to one and the current picture can be considered as the reference picture marked as used for reference.

Further, aspects of the exemplary embodiments may provide release of additional memory resources, such as co-located motion vector (MV) buffers associated with one or more reference pictures. The reference pictures contain Y, U, V components and co-located MV buffers. The co-located MV buffers may have one-fourth of the size of the reference pictures. The proposed method releases the one or more pictures along with the associated co-located MV buffers. Aspects of the exemplary embodiments may provide efficient usage of parallel processing operations, such as post processing, by releasing reference pictures marked as unused for reference from the DPB. Aspects of the exemplary embodiments may be used to efficiently re-use buffers under a multichannel environment. Furthermore, aspects of the exemplary embodiments be implemented using existing infrastructure and may not require extensive setup and instrumentations.

Referring now to the drawings and more particularly to FIGS. 1 through 6, in which similar reference characters denote corresponding features consistently throughout the figures, there are described the exemplary embodiments.

Figure 1:
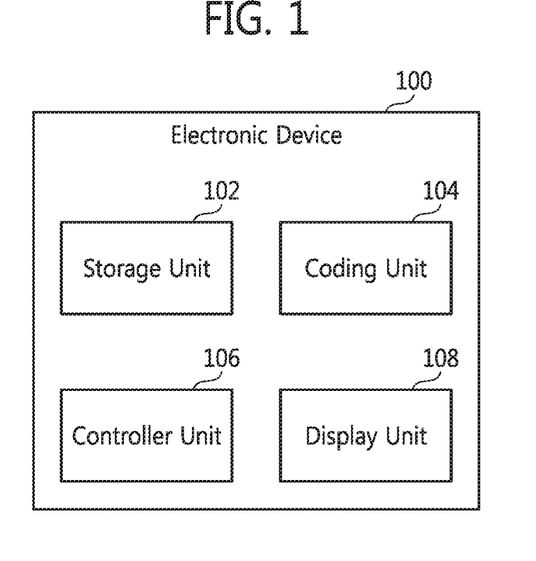
FIG. 1 illustrates a block diagram of an electronic device for marking a reference picture in a decoded picture buffer (DPB) for video coding, according to an exemplary embodiment.

FIG. 1 illustrates a block diagram of an electronic device 100 for marking a reference picture in a decoded picture buffer (DPB) for video coding, according to an exemplary embodiment.

In FIG. 1, the electronic device 100 includes a storage unit 102, a coding unit 104, a controller unit 106, and a display unit 108.

The storage unit 102 stores a plurality of pictures. The storage unit 102 may include one or more computer-readable storage media. The storing unit 102 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storing unit 102 may, in some examples, be considered a non-transitory storage medium. The term "non-transitory" indicates that the storage medium is not embodied in a carrier wave or a propagated signal. However, the term "non-transitory" should not be interpreted that the storage unit 102 is non-movable. In some examples, the storing unit 102 can be configured to store larger amounts of information and have capacity greater than conventional memory. In certain examples, a non-transitory storage medium may store data that can, over time, change (e.g., in Random Access Memory (RAM) or cache).

The coding unit 104 (i.e., encoder, decoder, etc.) can be configured to perform one or more actions for coding (either encoding or decoding) the pictures in the video. The coding unit 104 can be configured to obtain the pictures stored in the storage unit 102. The term "coding unit," as used in the context of FIG. 1 (i.e., encoder, decoder, etc.), is distinguished from the term coding unit, as used in the context of video coding for the amount, portion, or element of video data to be encoded or decoded (i.e., block, macroblock, etc.).

The coding unit 104 may be configured to embed the pre-marking and the post-marking command in the RPS while encoding the pictures in the video.

The RPS includes one or more reference pictures to be maintained in the DPB for decoding the current picture. Unlike the conventional methods, in which the pre-marking command is only embedded in the RPS, the proposed method allows the coding unit 104 to embed the pre-marking command and the post-marking command in the RPS. The RPS, which includes the post-marking command, is described in conjunction with the FIG. 3. It should be noted that the post-marking command may be applied for early release of a reference picture marked as unused for reference in DPB.

The coding unit 104 may be configured to decode the current slice of the current picture to extract the RPS from the current slice. The coding unit 104 may be configured to extract the RPS from the current slice after parsing slice header of the current slice.

The coding unit 104 may be configured to determine whether the current slice is a last slice of the current picture. If the coding unit 104 determines that current slice is the last slice of the current picture, then the coding unit 104 may be configured to mark the reference picture in the DPB with the post-marking command based on NAL unit type.

The NAL unit type may indicate the coding unit 104 to mark the current picture as used for reference or unused for reference. In an exemplary embodiment, the nal_ref_idc flag is introduced for post-marking of the current picture. In an exemplary embodiment, nal_unit type is defined from the reserved nal_unit_type category (such as nal_unit_type=10, 12, 14, 22, 23, 24~31). When the nal_unit type includes values (10, 12, 14, 22, 23, 24~31), it can be inferred that nal_ref_idc is equal to zero (i.e., binary 0) and the current picture can be considered as the reference picture marked as unused for reference. For other nal_unit_type, nal_ref_idc is equal to one (i.e., binary 1) and current picture can be considered as the reference picture marked as used for reference Further, the coding unit 104 may be configured to perform one or more actions on the DPB based on the NAL unit type. The one or more actions include releasing the reference picture marked as unused for reference in the DPB, maintaining the reference picture marked as used for reference in the DPB, and releasing co-located motion vector buffer associated with the reference picture marked as unused for reference in the DPB.

The controller unit 106 may be configured to communicate with the storage unit 102, the coding unit and the display unit. In an exemplary embodiment, the controller unit 106 may be configured to perform one or more actions associated with the storage unit 102, the coding unit 104 and the display unit 108. The controlling unit 106 may be implemented by a processor, microprocessor, central processing unit, controller, or any other controlling means of a video encoding and/or decoding apparatus.

The display unit 108 may be configured to display one or more pictures in the DPB. The one or more pictures in the DPB may be displayed based on POC value associated with the pictures.

Though the FIG. 1 illustrates a limited overview of the electronic device 100, it is to be understood that the device 100 is not limited thereto. The labels or names of the units are used only for illustrative purpose. Further, the electronic device 100 can include any number of units or sub-units communicating among each other along with the other components. Likewise, the functionalities of one or more units can be combined by a single unit or can be distributed among each other in a manner different than described herein without departing from the scope of the invention. For example, functionality of the coding unit 104 may be provided by the controlling unit 106.

Figure 2:
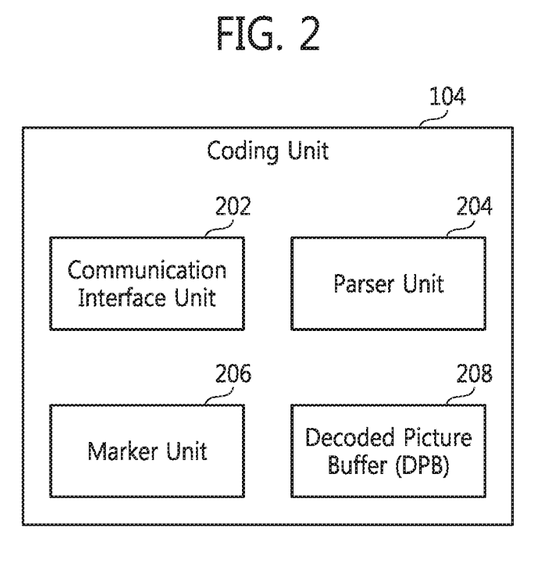
FIG. 2 is a block diagram illustrating a coding unit for marking the reference picture for video coding, according to an exemplary embodiment.

FIG. 2 is a block diagram illustrating a coding unit for marking the reference picture in the DPB for video coding, according to an exemplary embodiment.

In FIG. 2, the coding unit 104 includes a communication interface unit 202, a parser unit 204, a marker unit 206, and a DPB 208.

The communication interface unit 202 may be configured to transfer the RPS for decoding the pictures.

The parser unit 204 may be configured to parse each slice of the current picture while decoding the current picture. In an exemplary embodiment, the parser unit 204 may be configured to parse a slice header of a current slice of the current picture to extract RPS.

The marker unit 206 may be configured to mark the reference picture in the DPB 208 with the post-marking command based on NAL unit type. The reference picture is marked as "used for reference" or "unused for reference" based on the NAL unit type in the post-marking command.

The DPB 208 stores one or more reference pictures. The one or more reference pictures stored in the DPB 208 may be used as a reference for decoding pictures (succeeding the current picture) in the video.

Figure 3:
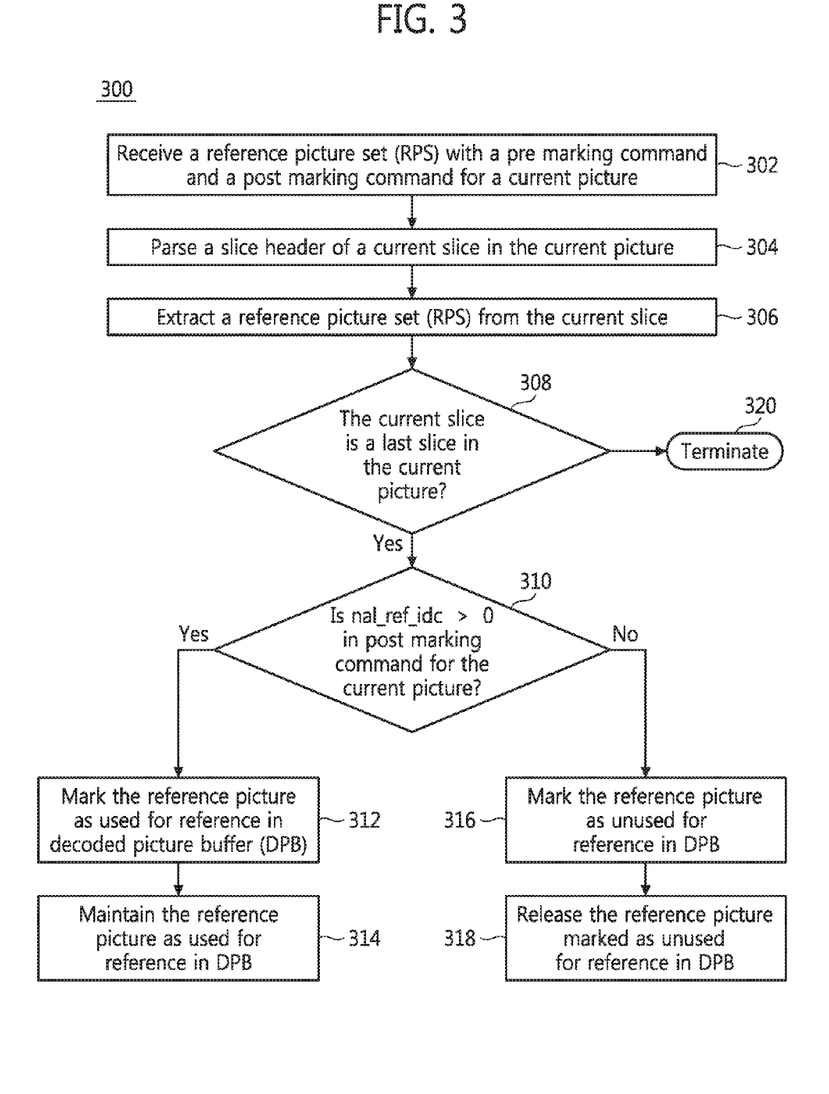
FIG. 3 is a flow chart illustrating a method of marking the reference picture in the DPB for video coding, according to an exemplary embodiment.

FIG. 3 is a flow chart illustrating a method 300 of marking the reference picture in the DPB for video coding, according to an exemplary embodiment.

At step 302, the RPS with the pre-marking command and the post-marking command for the current picture is received. With reference to FIG. 1, the coder unit 104 may receive the RPS with the pre-marking command and the post-marking command for the current picture.

In an exemplary embodiment, syntax of the RPS, which includes post-marking command, is as given below.

TABLE 1

| short_term_ref_pic_set( stRpsIdx ) { | Descriptor |
|---|---|
| if( stRpsIdx != 0 ) | |
|    inter_ref_pic_set_prediction_flag | u(1) |
| if( inter_ref_pic_set_prediction_flag ) { | |
|    if( stRpsIdx = = num_short_term_ref_pic_sets ) | |
|      delta_idx_minus1 | ue(v) |
|    delta_rps_sign | u(1) |
|    abs_delta_rps_minus1 | ue(v) |
|    for( j = 0; j <= NumDeltaPocs[ RefRpsIdx ]; j++ ) { | |
|      used_by_curr_pic_flag[ j ] | u(1) |
|      if( !used_by_curr_pic_flag[ j ] ) { | |
|         use_delta_flag[ j ] | u(1) |
|         used_by_following_pic_flag[ j ] = use_delta_flag[ j ] | |
|      } else { | |
|         used_by_following_pic_flag[ j ] | u(1) |
|      } | |
|    } | |
| } else { | |
|    num_negative_pics | ue(v) |
|    num_positive_pics | ue(v) |
|    j = 0; | |
|    for( i = 0; i < num_negative_pics; i++ ) { | |
|      delta_poc_s0_minus1[ i ] | ue(v) |
|      used_by_curr_pic_s0_flag[ i ] | u(1) |
|      if (used_by_curr_pic_s0_flag[ i ]) | |
|         used_by_following_pic_flag[ j++ ] | u(1) |
|      else | |
|         used_by_following_pic_flag[ j++ ] = 1; | |
|    } | |
|    for( i = 0; i < num_positive_pics; i++ ) { | |

TABLE 1-continued

```
short_term_ref_pic_set( stRpsIdx ) {                     Descriptor
    delta_poc_s1_minus1[ i ]                             ue(v)
    used_by_curr_pic_s1_flag[ i ]                        u(1)
    if (used_by_curr_pic_s1_flag[ i ])
        used_by_following_pic_flag[ j++ ]                u(1)
    else
        used_by_following_pic_flag[ j++ ] = 1
    }
  }
}
```

Bolded text in Table 1 indicates additional variables and syntax elements. In Table 1, the syntax element used_by_following_pic_flag[j] indicates the pictures needed after decoding of current picture, and the pictures are marked after decoding the pictures (post-marking). All the syntax structure definitions (in normal text) may be retained, as per the HEVC standard.

In HEVC, if a reference picture is needed for decoding current picture, it is unknown whether the reference picture is still needed after decoding of current picture. Hence, according to an exemplary embodiment, a modification is proposed to existing RPS syntax in the HEVC standard.

The syntax element used_by_following_pic_flag[j] array maintains the list of pictures to check if the reference pictures are still needed after the current picture is decoded.

At step 304, the slice header of the current slice in the current picture is parsed. With reference to FIG. 1, the coding unit 104 may parse the slice header of the current slice in the current picture.

At step 306, the RPS is extracted from the current slice. With reference to FIG. 1, the coding unit 104 may extract the RPS from the current slice. In an exemplary embodiment, the slice header of the current picture is decoded for extracting the RPS from the current slice.

At step 308, it may be determined whether the current slice is the last slice in the current picture. With reference to FIG. 1, the coding unit 104 may determine whether the current slice is the last slice in the current picture. If it is determined that the current slice is the last slice in the current picture, at step 308, at step 310, it may be determined whether the nal_ref_idc is greater than zero according to the post-marking command for the current picture. With reference to FIG. 1, the coding unit 104 may determine whether the nal_ref_idc is greater than zero according to the post-marking command for the current picture.

If it is determined, at step 308, that the current slice is not the last slice in the current picture then, the method is terminated at step 320 for the current slice. The method may be repeated for additional slices in the current picture.

In the exemplary embodiment, the nal_ref_idc flag is introduced for post-marking of the current picture. In an exemplary embodiment, nal_unit type is defined from reserved nal_unit_type category (such as nal_unit_type=10, 12, 14, 22, 23, 24~31). When the nal_unit type includes the values (10, 12, 14, 22, 23, 24~31), it can be inferred that nal_ref_idc is equal to zero and the current picture can be considered as the reference picture marked as unused for reference. For other values of nal_unit_type, nal_ref_idc is equal to one and current picture can be considered as the reference picture marked as used for reference.

If it is determined, at step 310, that the nal_ref_idc is greater than zero according to the post-marking command for the current picture then, at step 312, the reference picture is marked as used for reference in the DPB 208. With reference to FIG. 1, the coding unit 104 may mark the reference picture as used for reference in the DPB 208.

At step 314, the reference picture is maintained (as used for reference) in the DPB 208. With reference to FIG. 1, the coding unit 104 may maintain the reference picture in the DPB 208.

If it is determined, at step 310, that the nal_ref_idc is less than or equal to zero according to the post-marking command for the current picture then, at step 316, the reference picture is marked as unused for reference in the DPB 208. With respect to FIG. 1, the coding unit 104 may mark the reference picture as unused for reference in the DPB 208.

At step 318, the reference picture marked as unused for reference may be released from the DPB 208. With respect to FIG. 1, the coding unit 104 may release the reference picture marked as unused for reference from the DPB 208.

According to the method of FIG. 3, the post-marking command is applied after decoding last slice of the current picture, which results in optimal locking of reference buffers.

Thus, such implementation enables early release of the reference pictures, as opposed to the conventional system, in which the reference picture marked as unused for reference is released at the beginning of decoding of subsequent picture in the video. The proposed method also releases co-located MV buffers associated with one or more reference pictures and releases the one or more pictures along with the associated co-located MV buffers.

The various actions, acts, blocks, steps, or the like in the method may be performed in the order presented, in a different order or simultaneously. Further, in some exemplary embodiments, some of the actions, acts, blocks, steps, or the like may be omitted, added, modified, skipped, or the like without departing from the scope of the disclosure.

Figure 4:
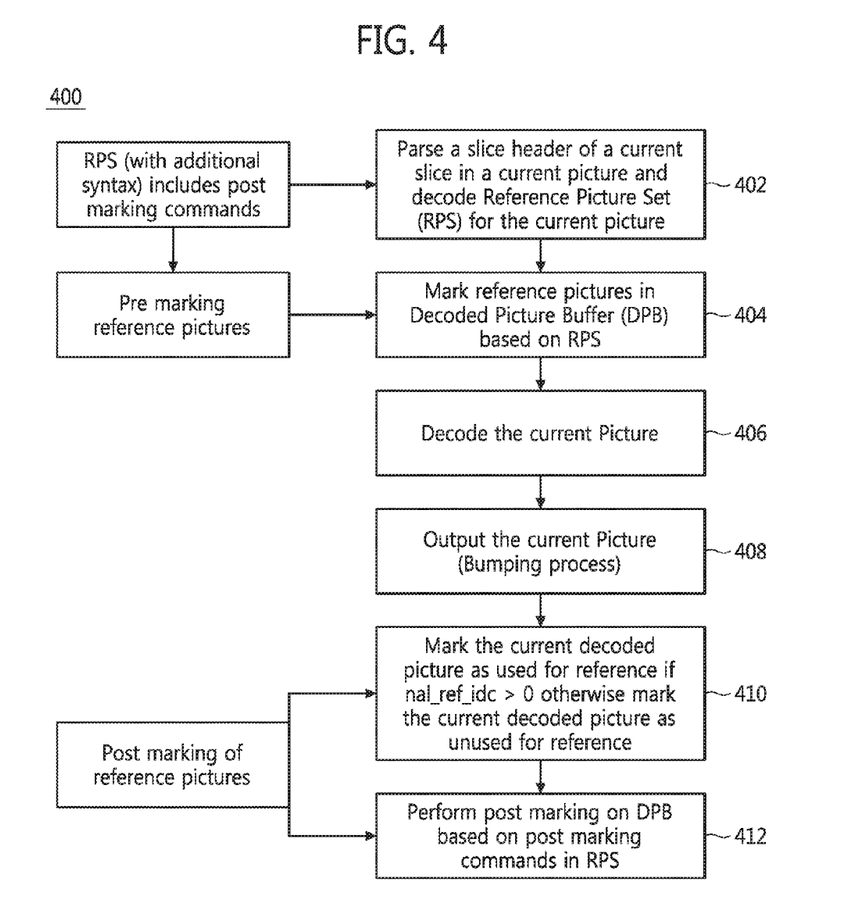
FIG. 4 is a flow chart illustrating a method for marking the reference picture in the DPB with a pre-marking command and a post-marking command, according to an exemplary embodiment.

FIG. 4 is a flow chart illustrating a method for marking the reference picture in the DPB with a pre-marking command and a post-marking command, according to an exemplary embodiment.

In FIG. 4, the method 400 includes sequence of steps that may be performed by the coding unit 104 or an encoding/decoding apparatus. The sequence of steps is detailed below.

At step 402, a slice header of the current slice in a current picture is parsed and RPS for the current picture is decoded.

At step 404, reference pictures are marked in the DPB 208 based on the RPS. The pre-marking command in the RPS is applied for all reference pictures in the DPB 208.

At step 406, the current picture is decoded.

At step 408, the current picture is output (bumping process).

At step 410, the current decoded picture is marked as used for reference if nal_ref_idc is greater than zero. Otherwise, the current decoded picture is marked as unused for reference.

At step 412, post-marking is performed on the DPB 208 based on the post-marking commands in the RPS.

Here, the post-marking commands are included in the RPS along with pre-marking commands. The pre-marking commands are applied before decoding the current slice of the current picture as shown in the FIG. 4 and the post-marking commands are applied after decoding the last slice of the current picture as show in the FIG. 4. With the post-marking commands, the reference pictures are marked as "used for reference" or "unused for reference." The reference picture marked as unused for reference is released from the DPB (instantly) after decoding the last slice of the current picture. Thus, early release of the reference pictures may be obtained, as opposed to the conventional system, in which the reference picture marked as unused for reference is released at the beginning of decoding of subsequent picture in the video.

Figure 5:
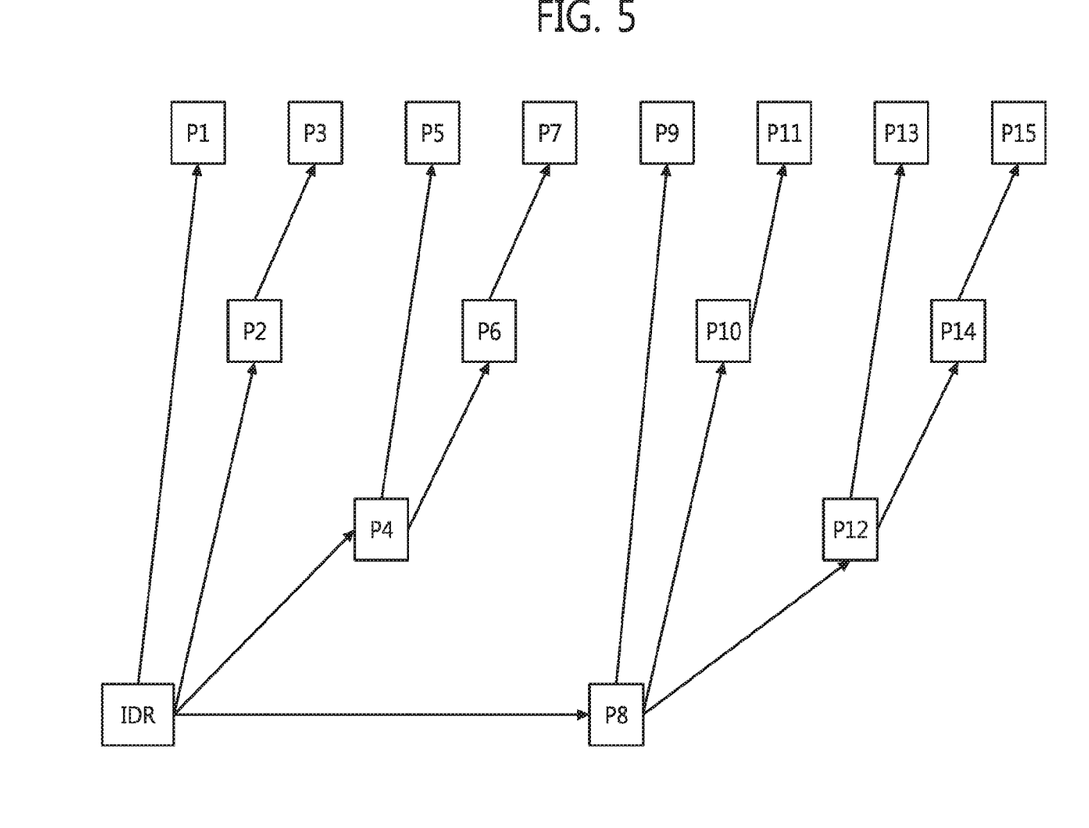
FIG. 5 is a diagram illustrating an example for post-marking of the reference pictures in a hierarchical-P prediction structure, according to an exemplary embodiment.

FIG. 5 is a diagram illustrating an example for post-marking of the reference pictures in the hierarchical-P prediction structure, according to an exemplary embodiment.

In FIG. 5, the plurality of pictures P1-P14 is shown. Each picture after an Instantaneous Decoder Refresh (IDR) picture is predicted from the preceding picture, as shown in the FIG. 5. The arrows shown in the FIG. 5 indicate the dependency among the pictures. For example, P1 is dependent on the IDR picture as the reference picture. P3 is dependent on the IDR picture and P2. P7 is dependent on the IDR picture, picture P4, and picture P6.

Initially, the IDR picture is decoded. For the IDR picture, the RPS is not signaled, because no picture that precedes the IDR picture in decoding order can be used for reference by the IDR picture. The RPS includes a null value when the IDR is picture is being decoded. For the picture P1, the RPS includes the IDR picture (because the IDR picture is used as reference picture for decoding the picture P1).

The picture P1 is decoded using the IDR picture as the reference picture. In the conventional system (HEVC), the RPS for the picture P1 includes the IDR picture. Further, the picture P1 is released from the DPB 208 when the picture P2 is decoded. Releasing the pictures from the DPB 208 in the HEVC standard is shown in Table 2 below, which provides a comparison showing the release of the reference pictures in the HEVC standard and the proposed post-marking method according to an exemplary embodiment.

TABLE 2

| Current Picture | HEVC | Proposed post-marking |
|---|---|---|
| IDR | RPS = {NULL} | |
| P1 | RPS = {IDR} | P1 released |
| P2 | RPS = {IDR}; P1 released | |
| P3 | RPS = {IDR, P2} | P2 released, P3 released |
| P4 | RPS = {IDR}; P2, P3 released | |
| P5 | RPS = {IDR, P4} | P5 released |
| P6 | RPS = {IDR, P4}; P5 released | |
| P7 | RPS = {IDR, P6} | P6, P7 released |
| P8 | RPS = {IDR}; P6, P7 released | |
| P9 | RPS = {P8} | P9 released |

According to an exemplary post-marking method, when the first slice of the picture P1 is decoded, the RPS is extracted. The RPS includes the post-marking command. The picture P1 is marked with post-marking command based on the NAL unit type. If the nal_ref_idc is greater than zero, then the picture P1 is marked as the reference picture used as reference. If the nal_ref_idc is less than or equal to zero, the picture P1 is marked as unused for reference. At the end of decoding of the last slice of each picture, post-marking commands are applied based on the NAL unit type. Further, the pictures marked as unused for reference are released from the DPB and the pictures marked as used for reference are maintained in the DPB.

From FIG. 5, it can be inferred that the picture P1 needs the IDR picture as the reference picture. The RPS for the picture P1 includes the IDR picture. When the first slice of the picture P1 is decoded, the RPS of the picture P1 is extracted. The RPS of the P1 indicates that the picture P1 is not used as reference for the pictures (P2-P15). After decoding the last slice of the picture P1, the post-marking command is applied on the picture P1. The picture P1 is marked as the reference picture unused for reference. Further, the picture P1 is released from the DPB 208 after decoding the last slice of the picture P1.

The pictures are marked with the post-marking command based on the NAL unit type. The reference pictures marked as unused for reference are released from the DPB. The reference pictures marked as unused for reference (based on the post-marking command) are released (instantly) after decoding each picture, as shown in Table 2. Thus, with the post-marking command, the reference pictures marked as unused for reference are released early from the DPB, when compared to release of the pictures in conventional systems.

With the proposed method, using the post-marking command, the reference pictures marked as unused for reference can be earlier released from the DPB, as shown in Table 2.

The proposed method allows releasing of co-located motion vector (MV) buffers associated with the one or more reference pictures marked as unused for reference. The co-located MV buffers may have one-fourth of the size of the reference pictures. Thus, the proposed method releases the one or more pictures marked as unused for reference along with the associated co-located MV buffers.

Figure 6:
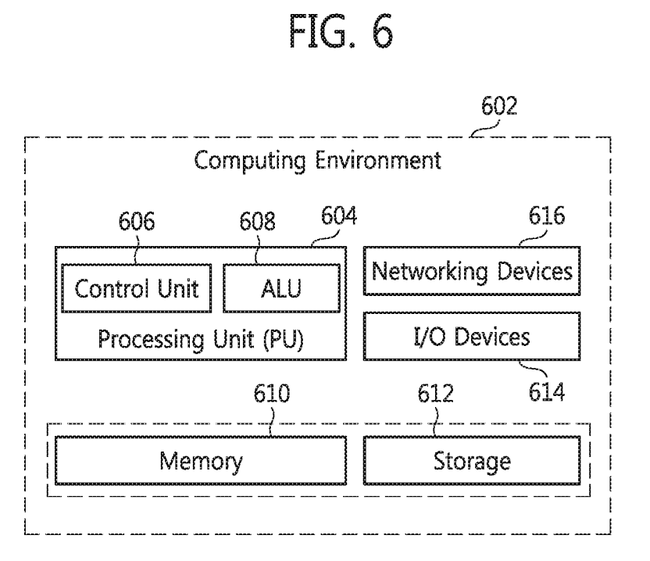
FIG. 6 is a block diagram illustrating a computing environment implementing the method for marking the reference picture in video coding, according to an exemplary embodiment.

FIG. 6 is a block diagram illustrating a computing environment implementing the method for marking the reference picture in video coding, according to an exemplary embodiment.

As depicted in the FIG. 6, the computing environment 602 comprises at least one processing unit 604 that is equipped with a control unit 606 and an Arithmetic Logic Unit (ALU) 608, a memory 610, a storage unit 612, networking devices 616, and input/output (I/O) devices 614. The processing unit 604 is responsible for processing the instructions of the coding method. The processing unit 604 receives commands from the control unit to perform coding processing. Further, any logical and arithmetic operations involved in the execution of the instructions are computed with the help of the ALU 608.

The overall computing environment 602 can be composed of multiple homogeneous and/or heterogeneous cores, multiple CPUs of different kinds, special media and other accelerators. The processing unit 604 is responsible for processing the instructions of the coding algorithm. Further, the plurality of processing units 604 may be located on a single chip or distributed over multiple chips.

The algorithm comprising of instructions and codes required for the implementation are stored in either the memory unit 610 or the storage 612, or both. At the time of execution, the instructions may be fetched from the corresponding memory 610 or storage 612, and executed by the processing unit 608.

In case of any hardware implementations various networking devices 616 or external I/O devices 614 may be connected to the computing environment to support the implementation through the networking unit and the I/O device unit.

The exemplary embodiments disclosed herein may be implemented through at least one software program running on at least one hardware device and performing network management functions to control the elements. The elements shown in the FIGS. 1 and 6 include blocks that may be implemented by at least one of a hardware device and software, or a combination of hardware device and a software module.

The foregoing description will so fully reveal the nature of the exemplary embodiments herein that others can, by applying current knowledge, readily modify and/or adapt for various applications such exemplary embodiments without departing from the disclosure, and, therefore, such adaptations and modifications should and are intended to be comprehended within the meaning and range of equivalents of the disclosed exemplary embodiments. It is to be understood that the phraseology or terminology employed herein is for the purpose of description and not of limitation. Therefore, while the exemplary embodiments herein have been described in terms of preferred embodiments, those skilled in the art will recognize that the exemplary embodiments herein can be practiced with modification within the spirit and scope of the exemplary embodiments as described herein.

The invention claimed is:

1. A video coding method, the method comprising:
   embedding, by a video coding apparatus, a pre-marking command in a reference picture set (RPS) for a current picture;
   decoding, by the video coding apparatus, the current slice of the current picture to extract the RPS from the current slice;
   determining, by the video coding apparatus, whether the current slice is a last slice of the current picture;
   marking, by the video coding apparatus, a reference picture in a decoded picture buffer (DPB) with the post-marking command based on a network abstraction layer (NAL) unit type; and
   performing an action on the DPB based on the NAL unit type,
   wherein the pre-marking is applied before decoding a current slice of the current picture and a post-marking is applied after decoding a last slice of the current picture, and
   wherein the action comprises at least one of releasing a reference picture marked as unused for reference in the DPB, maintaining a reference picture marked as used for reference in the DPB, and releasing a co-located motion vector buffer associated with a reference picture marked as unused for reference in the DPB.

2. The method of claim 1, wherein the post-marking command is applied to release a reference picture marked as unused for reference in DPB.

3. A video coding method, the method comprising:
   decoding, by a video coding apparatus, a current slice of a current picture to extract a reference picture set (RPS) from the current slice;
   determining, by the video coding apparatus, whether the current slice is a last slice of the current picture;
   marking, by the video coding apparatus, a reference picture in a decoded picture buffer (DPB) with a post-marking command after decoding the last slice of the current picture based on network abstraction layer (NAL) unit type; and
   performing an action on the DPB based on the NAL unit type,
   wherein the action comprises at least one of releasing a reference picture marked as unused for reference in the DPB, maintaining a reference picture marked as used for reference in the DPB, and releasing a co-located motion vector buffer associated with a reference picture marked as unused for reference in the DPB.

4. The method of claim 3, wherein the post-marking command is applied to release of a reference picture marked as unused for reference in the DPB.

5. A video coding apparatus comprising:
   a memory configured to store computer-readable instructions; and
   a processor configured to execute the computer-readable instructions, which when executed cause the processor to implement functions of:
      a coding unit configured to:
         embed a pre-marking command and a post-marking command in a reference picture set (RPS) of a current picture;
         decode a current slice of a current picture to extract a reference picture set (RPS) from the current slice;
         determine whether the current slice is a last slice of the current picture;
         mark a reference picture in a decoded picture buffer (FRB) with a post-marking command based on a network abstraction layer (NAL) unit type; and
         perform an action on the DPB based on the NAL unit type,
   wherein the pre-marking is applied before decoding a current slice of the current picture and the post-marking is applied after decoding a last slice of the current picture, and
   wherein the action comprises at least one of releasing a reference picture marked as unused for reference in the DPB, maintaining a reference picture marked as used for reference in the DPB, and releasing a co-located motion vector buffer associated with a reference picture marked as unused for reference in the DPB.

6. The video coding apparatus of claim 5, wherein the post-marking command is applied for early freeing of non-reference picture in the DPB.

7. A non-transitory computer-readable recording medium having embodied thereon executable program code, the computer executable program code when executed causes a video coding apparatus to execute a method of video coding, the method comprising:
   embedding a pre-marking command and a post-marking command in a reference picture set (RPS) for a current picture;
   decoding, by the video coding apparatus, the current slice of the current picture to extract the RPS from the current slice;
   determining, by the video coding apparatus, whether the current slice is a last slice of the current picture;
   marking, by the video coding apparatus, a reference picture in a decoded picture buffer (DPB) with the post-marking command based on a network abstraction layer (NAL) unit type; and
   performing an action on the DPB based on the NAL unit type,
   wherein the pre-marking is applied before decoding a current slice of the current picture and a post-marking is applied after decoding a last slice of the current picture, and
   wherein the action comprises at least one of releasing a reference picture marked as unused for reference in the DPB, maintaining a reference picture marked as used for reference in the DPB, and releasing a co-located motion vector buffer associated with a reference picture marked as unused for reference in the DPB.

8. A non-transitory computer-readable recording medium having embodied thereon computer executable program code, the computer executable program code when executed causes a video coding apparatus to execute a method of video coding, the method comprising:
   decoding a current slice of a current picture to extract a reference picture set (RPS) from the current slice;

determining whether the current slice is a last slice of the current picture;
marking a reference picture in a decoded picture buffer (DPB) with a post-marking command after decoding the last slice of the current picture based on network abstraction layer (NAL) unit type; and
performing an action on the DPB based on the NAL unit type,
wherein the action comprises at least one of releasing a reference picture marked as unused for reference in the DPB, maintaining a reference picture marked as used for reference in the DPB, and releasing a co-located motion vector buffer associated with a reference picture marked as unused for reference in the DPB.

* * * * *